United States Patent
Riedel et al.

(10) Patent No.: US 10,997,953 B2
(45) Date of Patent: May 4, 2021

(54) MULTI-RESOLUTION GRAPHICS

(71) Applicant: Viacom International Inc., New York, NY (US)

(72) Inventors: Gregg William Riedel, Woodbury, NY (US); Jeff Hess, New York, NY (US); Scott Danahy, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 667 days.

(21) Appl. No.: 15/438,339

(22) Filed: Feb. 21, 2017

(65) Prior Publication Data
US 2017/0162178 A1   Jun. 8, 2017

Related U.S. Application Data

(63) Continuation of application No. 13/534,904, filed on Jun. 27, 2012, now abandoned.

(51) Int. Cl.
*G09G 5/391* (2006.01)
*H04N 21/81* (2011.01)
(Continued)

(52) U.S. Cl.
CPC .......... *G09G 5/391* (2013.01); *G09G 5/005* (2013.01); *H04N 21/4312* (2013.01);
(Continued)

(58) Field of Classification Search
None
See application file for complete search history.

(56) References Cited

U.S. PATENT DOCUMENTS

| 5,546,131 A * | 8/1996 | Terry | H04N 5/44513 |
| | | | 348/468 |
| 2003/0025833 A1 * | 2/2003 | Mountain | H04N 5/44513 |
| | | | 348/468 |

(Continued)

FOREIGN PATENT DOCUMENTS

| EP | 0 662 272 | 4/1999 |
| EP | 1 819 165 | 8/2015 |

(Continued)

*Primary Examiner* — Yingchun He
(74) *Attorney, Agent, or Firm* — Fay Kaplun & Marcin, LLP

(57) ABSTRACT

Provided herein is technology for displaying, reposition, and/or formatting graphics on a display. The technology includes receiving a graphics stream in a first playout format that includes a first display resolution and first display layout. The technology also includes determining a second playout format that includes a second display resolution and a second display layout. The technology further determines an area of importance within the first display layout given the first display layout, second display resolution, and second display layout. A preferred position within the second display layout is determined so that the preferred position is a location in the second display layout that is in a relatively similar location as the area of importance in the first display layout. The first playout format is converted into the second playout format using the area of importance and preferred position. Finally, the graphics stream is displayed in the second playout format.

20 Claims, 9 Drawing Sheets

(51) Int. Cl.
*H04N 21/488* (2011.01)
*G09G 5/00* (2006.01)
*H04N 21/431* (2011.01)

(52) U.S. Cl.
CPC ..... *H04N 21/4882* (2013.01); *H04N 21/8146* (2013.01); *G09G 2340/0407* (2013.01); *G09G 2360/02* (2013.01)

(56) References Cited

U.S. PATENT DOCUMENTS

| | | | | |
|---|---|---|---|---|
| 2005/0160468 | A1* | 7/2005 | Rodriguez | G06F 3/14 |
| | | | | 725/109 |
| 2006/0064716 | A1* | 3/2006 | Sull | G06F 17/30793 |
| | | | | 725/37 |
| 2008/0084503 | A1* | 4/2008 | Kondo | G09G 5/005 |
| | | | | 348/556 |
| 2011/0032979 | A1* | 2/2011 | Matsuo | H04N 19/63 |
| | | | | 375/240.01 |
| 2011/0085078 | A1 | 4/2011 | Sie et al. | |
| 2012/0075526 | A1* | 3/2012 | DeHaan | H04N 5/445 |
| | | | | 348/445 |

FOREIGN PATENT DOCUMENTS

| | | |
|---|---|---|
| JP | 2008/098800 | 4/2008 |
| JP | 2008/199370 | 8/2008 |
| JP | 2009/188462 | 8/2009 |
| JP | 2010/193150 | 9/2010 |
| JP | 2010/245618 | 10/2010 |
| JP | 2010245618 | 10/2010 |
| JP | 2011/151750 | 8/2011 |
| WO | 2010/055560 | 5/2010 |
| WO | 2010/143106 | 12/2010 |
| WO | 2011/128829 | 10/2011 |

* cited by examiner

MULTI-RESOLUTION GRAPHICS

PRIORITY CLAIM

The present application is a Continuation Application of pending U.S. Non-Provisional patent application Ser. No. 13/534,904 filed on Jul. 27, 2012. The entire disclosure of this prior application is considered as being part of the disclosure of the accompanying application and hereby expressly incorporated by reference herein.

FIELD OF THE INVENTION

This invention relates generally to the production and delivery of broadcast graphics or animation assets.

BACKGROUND OF THE INVENTION

Content providers generally delivery content, such as TV programs or movies, to consumers in the form of video through a variety of mediums, such as broadcast television, cable television and streaming internet video. Content providers use broadcast graphics and animation assets to not only identify the content provider but also to provide extras that were not originally part of the provided content. Broadcast graphics and animation assets include TV station logos and scrolling tickers.

In recent years, content providers have been forced to provide content in different formats to not only accommodate standard definition "SD") and high definition ("HD") formats, but also varying display sizes. Although simple scaling (e.g., stretching or shrinking) can be done to change content from one format to another, broadcast graphics and animation assets may get distorted in the simple scaling process.

Content providers can avoid broadcast graphics and animation assets distortion by providing a set of broadcast graphics and animation assets that are customized for every supported format in which the content provider provides content. However, this technique is both costly and time consuming since multiple sets of the same broadcast graphics and animation assets must be created. What is desired is a solution that streamlines the production and delivery of broadcast graphics or animation assets.

SUMMARY OF THE INVENTION

The invention streamlines the production and delivery of broadcast graphics or animation assets by allowing the same graphics stream to be displayed correctly at various display resolutions and display layouts. A graphics stream is created for a base HD widescreen layout and is then scaled appropriately and/or repositioned when played for different resolutions or layouts.

The invention, in one aspect features a method, executed by one or more computer processors in communication with one or more displays, for displaying graphics on the display. The method can include using one or more computer processors to receive a graphics stream in a first playout format. The first playout format can have a first display resolution and a first display layout. The one or more computer processors can also determine a second playout format having a second display resolution and a second display layout. Furthermore, the one or more computer processors can determine an area of importance within the first display layout given the first display layout, the second display resolution, and the second display layout. A preferred position can be determined within the second display layout. The preferred position can be at a location u the second display layout that is in a relatively similar location as the area of importance in the first display layout. The one or more computer processors can covert the first playout format into the second playout format using the area of importance and the preferred position. The graphics stream in the second playout format can then be displayed by the one or more computer processors on the one or more displays.

Another aspect of the invention includes a computer program product, tangibly embodied in a non-transitory computer readable storage medium, which can display graphics on a display. The computer program product can receive a graphics stream in a first playout format. The first playout format can have a first display resolution and a first display layout. The computer program product can also determine a second playout format that includes a second display resolution and a second display layout. An area of importance within the first display layout can be determined given the first display layout, the second display resolution and the second display layout. A preferred position can also be determined given the first display layout, the second display resolution, and the second display layout. Furthermore, the computer program product can convert the first playout format into the second playout format using the area of importance and the preferred position. The graphics stream in the second playout format can then be displayed on the one Or more displays.

Each of the aspects above can further employ one or more of the following advantages.

In some embodiments, converting includes scaling the graphics stream from the first display resolution to the second display resolution so that the area of importance of the first display layout is scaled to fit in the second display layout and portions of the first display layout that are not found at the area of importance are allowed to be cutoff. Converting can also include repositioning the graphics stream into the second display layout based on the area of importance such that the repositioning places the graphics found in the area of importance at the preferred position in the second display layout.

In some embodiments, each graphic of the graphics stream can include a horizontal alignment indicator or a vertical alignment indicator. The horizontal alignment indicator can be left, center, or right. The vertical alignment indicator can be top, center, or bottom.

In some embodiments, one or more graphics of the graphics stream can be indicated as being graphics that are displayed in the second display layout. The area of importance can be determined by defining a bounded region that covers a portion of the first playout format based on the first display layout, the second display layout, horizontal alignment indicators of the one or more indicated graphics, and vertical alignment indicators of the one or more indicated graphics.

In some embodiments, repositioning the graphics stream can include shifting the graphics stream by a preset amount based on a horizontal alignment indicator, a vertical alignment indicator, the second display resolution or the second display layout. Repositioning the graphics stream can also include shifting the graphics stream by a configurable shift amount based on content provider dynamic scripts.

In some embodiments, the first display layout and the second display layout can have a layout type, for example, a widescreen layout, a pillarbox layout, a full screen layout, or a letterbox layout. The first display layout and the second display layout can also be different layout types. The first display layout and the second display layout can be different layout types.

In some embodiments, a second playout format can be determined by determining a playout format of a video stream over which the graphics stream is to be displayed, reading a hint on a playlist used to override or supplement the information from the video stream, and using a playout format based on the playout format of the video stream and the hint.

In some embodiments, the graphics stream can include a portion created by a dynamic script, Script variables can be used to indicate the display resolution and the display layout of the graphics stream.

In some embodiments, the second display resolution can be a high definition format or a standard definition format. A resolution graphic can be used to indicate the playout format. The resolution graphic can be displayed only when indicating the playout format is the high definition format.

In some embodiments, the graphics stream can be a static graphics presentation or an animated graphics presentation.

In some embodiments, a crawl graphic is displayed. Converting can remove a portion of the crawl graphic.

Further features and advantages of the present invention as well as the structure and operation of various embodiments of the present invention are described in detail below with reference to the accompanying drawings.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
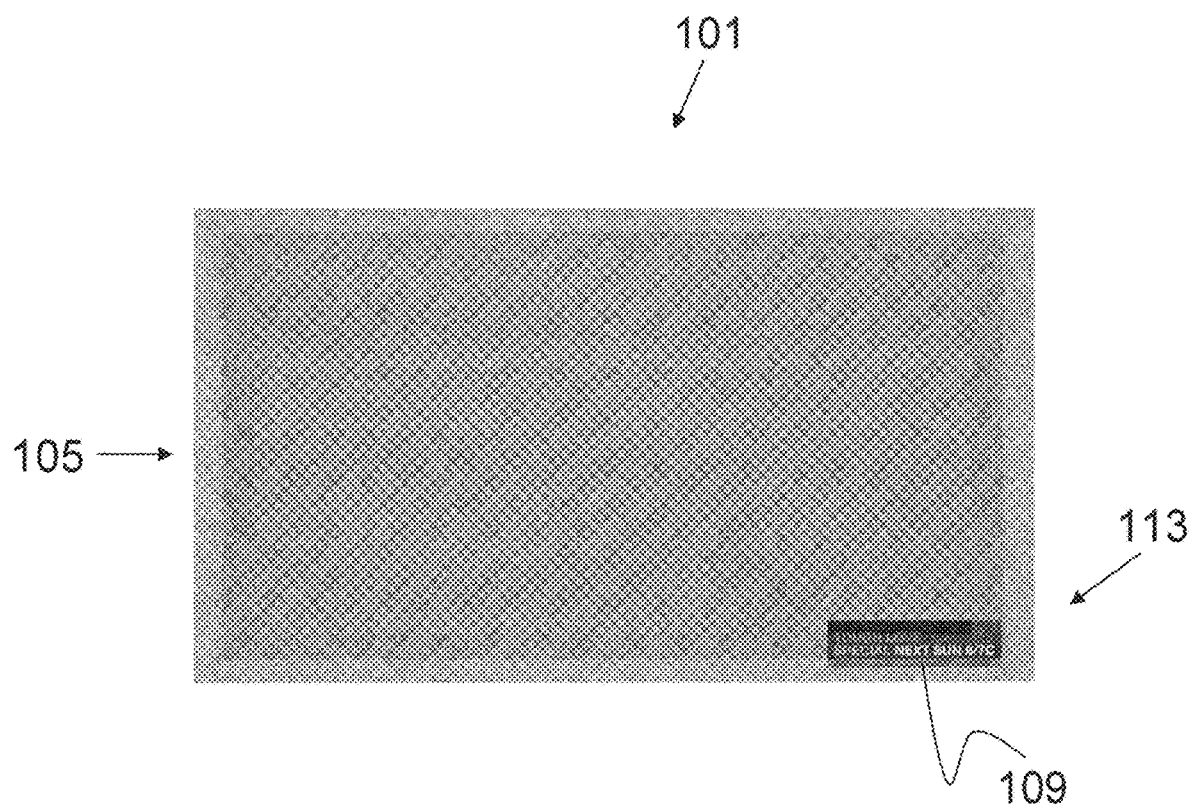
FIG. 1 shows a graphics stream that has been created in a HD widescreen layout.

FIG. 1 shows a graphics stream 101 on a display 105 that has been created in a first playout format HD widescreen layout As a default, the first playout format of the display 105 can be created using a HD display resolution and a widescreen display layout. The first playout format can include a graphic 109. All graphics, including the graphic 109, can be either broadcast graphics or animation assets. All graphics, including the graphic 109, can feature items such as identifying information (e.g., logos), advertisements, news, descriptive text, content metadata, and show credits. The graphic 109 can be placed anywhere within the display that is used for displaying the first playout format on the display 105. There can also be multiple graphics from the graphics stream 101 that are displayed, and these graphics can be converted accordingly to fit onto any possible display (e.g., any display resolution and display layout). Conversion can include scaling or repositioning.

In some embodiments, the graphics stream 101 can have any possible display resolution along with any possible display layout. A display resolution can refer to the width and height of a display, as well as the number of pixels that can be displayed. Possible display resolutions include SD or HD. A display layout can refer to the shape of a display. Possible display layouts can include widescreen, pillarbox, fullscreen, or letterbox, Specific examples of display layouts include a 1.85:1 layout, a 2.35:1 layout, a postage stamp layout, a 14:9 letterbox layout, a 1.85:1 letterbox layout, a 2.35:1 letterbox layout, or an anamorphic layout. Other layouts are also possible and the invention is expressly not limited to the foregoing.

The first playout format of the display 105 includes an area of importance 113. The area of importance 113 is a portion of the first playout format of the display 105 that is preserved in the conversion to a second playout format (e.g., a second display layout and a second display resolution). The area of importance 113 is determined based on the display layout of the first playout format of the display 105 and the second playout format. The area of importance 113 can be defined by a rectangular box that covers portion of first playout format of the display 105. In other embodiments, the area of importance can be defined by any bounded shape or region within the first playout format of the display 105. The area of importance 113 is appropriately converted (e.g., scaled and repositioned) so that graphics found in the bounded rectangle fit in the second playout format. The area of importance 113 can act as a focal point for conversion. In other words, conversion can be done based on a relative location of the area of importance 113 in the first playout format of the display 105, such that any scaling or repositioning ensures that the area of importance 113 is maintained in the conversion and does not get cutoff or distorted in the converted playout format. In some embodiments, indicators can be assigned to the graphics stream 101 or the first playout format of the display 105 to indicate which graphics are to be preserved in a conversion. The area of importance 113 can be created to encompass all indicated graphics. Indicators can be assigned with a priority so that the area of importance 113 can include only graphics with indicators of a certain priority range. The converted hounded rectangle can be positioned in a relatively similar position in the second playout format as the position of the area of importance 113 in the first display layout of the display 105. For example, if the area of importance 113 is found in the bottom right portion of the first display layout of the display 105, the converted bounded rectangle is also found in the bottom right portion of the second playout format. Portions of the first playout format of the display 105 that are not within the area of importance 113 can be cut off or removed in the conversion process, even if graphics are located in those portions.

In other embodiments, the display can be in communication with one or more computer processors (not shown). The one or more processors can receive the graphics stream 101 from a content provider. The one or more processors can also make the determinations necessary for converting graphics found in the graphics stream 101. Conversion, which can be executed by the one or more computer processors, can include scaling and repositioning.

In some embodiments, a user interface is utilized by a user to define parameters used for the conversion. For example, the user interface allows the user to define the area or importance by, e.g., specifying a rectangle that bounds the area of importance, or giving coordinates of the area of importance, or in the case of a graphical user interface, using a mouse to select or highlight an area of importance. In some embodiments, the user interface also prompts the user to provide the target resolution, for example in a graphical user interlace, the user is prompted, via user-fillable text boxes, radio buttons, or drop down menus.

In some instances, the user interface is presented as a web page that is submitted to a server that carries out the conversion. In other embodiments, the user interface is a graphical-user-interface that is part of the converter program. In still other embodiments, the user interface is a command-line interface to the converter program and parameters are provided as command line options. Alternatively, the parameters can be provided as part of an interactive script, e.g., the first playout is specified from menu options, then the second playout is specified, and so on.

In some embodiments, conversion can be done on the fly and a user can change the parameters used for conversion as the graphics stream is being played back. A change will send a request back to the server to convert the graphics into a desired or selected display layout.

Figure 2:
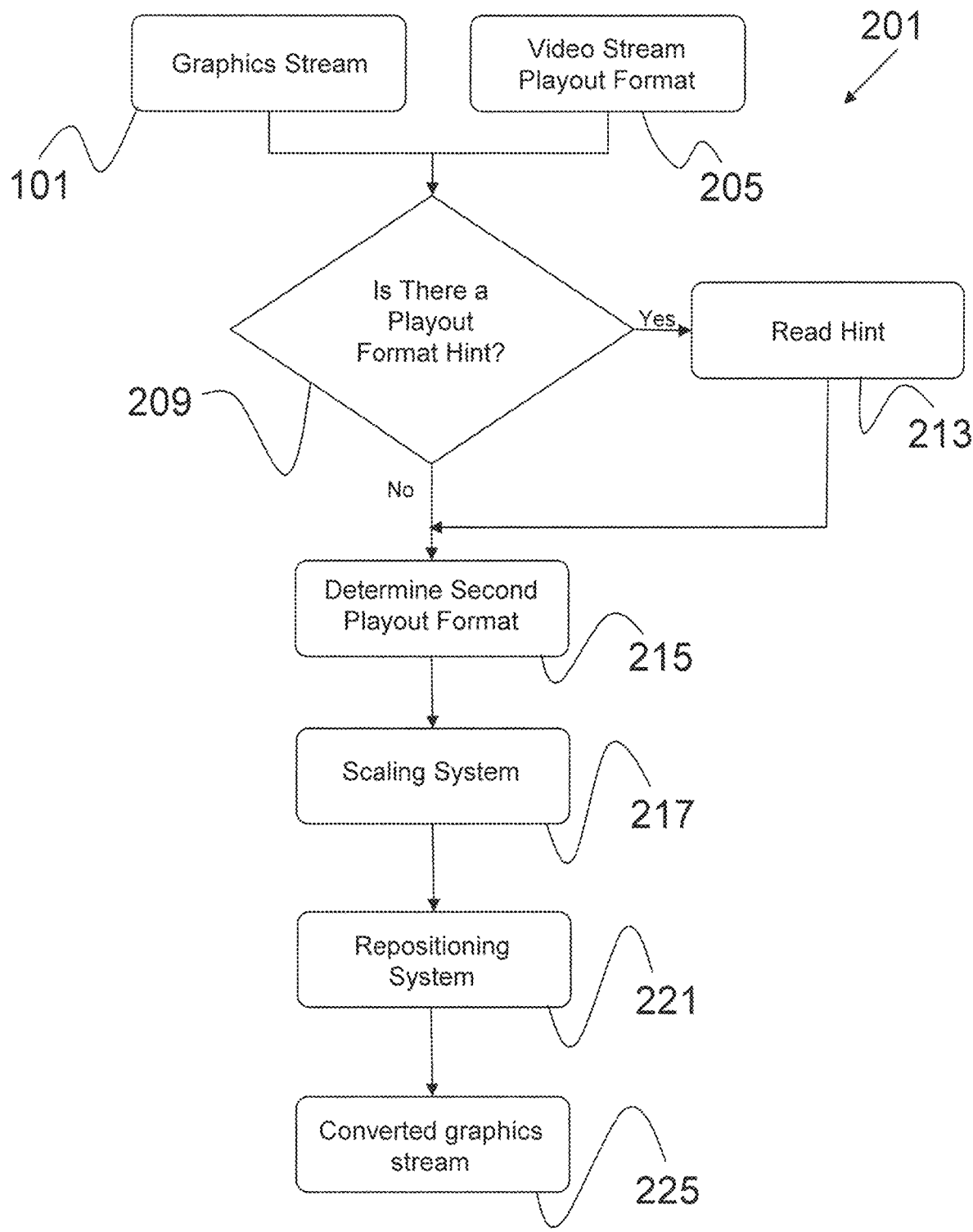
FIG. 2 shows a graphics stream conversion process.

FIG. 2 shows a graphics stream conversion process 201 that starts with the graphics stream 101 and a video stream playout format 205. A video stream playout format 205 is a default playout format for the display that displays the converted graphics stream. The video stream playout format 205 can be determined by reading a video stream dynamic script. A video stream dynamic script is a software module that executes in sequence with a video stream allowing dynamic control over video and graphics playout. Step 209 can detect if the graphic stream 101 has a playlist that contains a hint. A hint is a dynamic script variable that indicates a desired display resolution or a desired display layout. If there is a hint, the hint is read in step 213. Step 215 determines a second playout format. Step 215 can use the graphics stream 101, the hint and the video stream playout format 205 to determine the second playout format (including a second display resolution and a second display layout). If there is no hint, the second playout format is the same as the video stream playout format 205. However, if there is a hint, then the second playout format can be different from the video stream playout format 205. The hints can override or supplement the video stream playout format 205. However, hints can also be ignored depending on the particular hint, the video stream playout format 205, the base graphics stream 101, or any combination of these. In some embodiments, the read hint step 213 can use a scheduler. The scheduler can schedule hints on a content provider playlist to indicate the content type necessary for playback.

The scaling system 217 can scale or change the resolution of the graphics stream 101 into the second display resolution. Scaling can be the stretching or shrinking of the display resolution. Scaling can be centered around the area of importance 113. For example, scaling can be done using center-cut down-convert scaling factors based on the area of importance 113. However, any scaling factor or process can be used in converting from the graphics stream 101 display resolution to a second display resolution, including simply scaling (see above).

Figure 3:
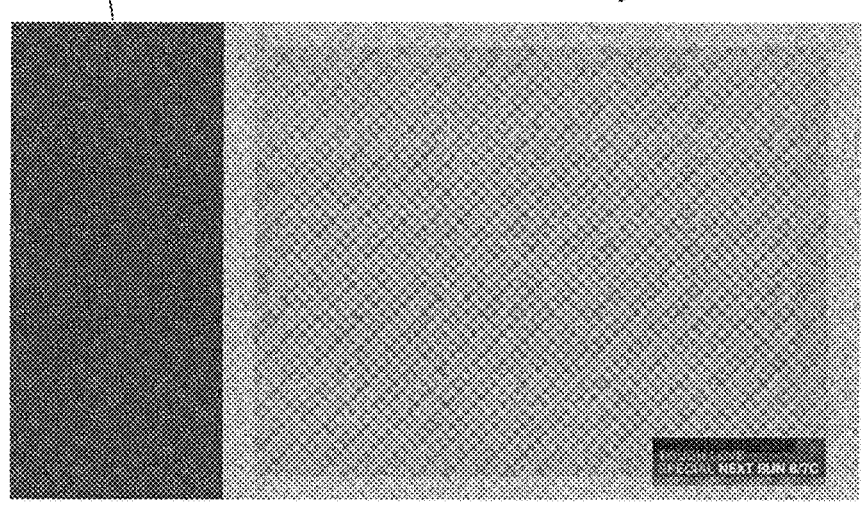
FIG. 3 shows how the graphics stream will be converted into a SD fullscreen layout.

A repositioning system 221 gives instructions on which area of the graphics stream 101 to cut or move. The repositioning system 221 can use horizontal and vertical alignment indicators specified by graphic 109. The horizontal and vertical alignment indicators can indicate a position of the graphic 109 in relation to the graphics stream 101. The horizontal alignment can be left, center, or right. A left horizontal alignment implies that the graphic 109 is in the left-hand side of the graphic stream 101. A center horizontal alignment implies that the graphic 109 is in the horizontal center of or spans the graphic stream 101. A right horizontal alignment implies that the graphic 109 is in the right-hand side of the graphic stream 101. The vertical alignment can be top, center, or bottom. A top vertical alignment implies that the graphic 109 is near or is anchored to the top of the graphic stream 101. A center vertical alignment implies that the graphic 109 is near the middle of the graphic stream 101. A bottom vertical alignment implies that the graphic 109 is near or is anchored to the bottom of the graphic stream 101. For example, FIG. 3 shows a right horizontal alignment with a bottom vertical alignment. A horizontal alignment and a vertical alignment can have different effects on the positioning of graphics in a converted graphics stream 225 based on the display resolution or the display layout. In some embodiments, the horizontal alignment and the vertical alignment can, instead, indicate a position of the area of importance 113 in relation to the graphics stream 101. The repositioning system can treat the area of importance 113 like a graphic 109 as described above.

In some embodiments, the positioning system 221 uses a preferred position within the converted graphics stream. The preferred position is an area of a converted display layout in which the converted graphics from the area of importance 113 is found. The preferred position can be determined by the location of the area of importance 113 in the graphics stream 101, a preference indicated by a video stream playout format, or a shift amount (see below). If the preferred position is determined by the location of the area of importance 113, the preferred position can be placed in a location on the converted display layout that is in a relatively similar location as the area of importance 113 in the graphics stream 101. For example, if an area of importance 113 is found in the top left of the graphics stream 101, the preferred position can be found in the top left of the converted display layout. The preferred position can be shifted by a shift amount when the preferred position is determined by the location of the area of importance 113.

Figure 4:
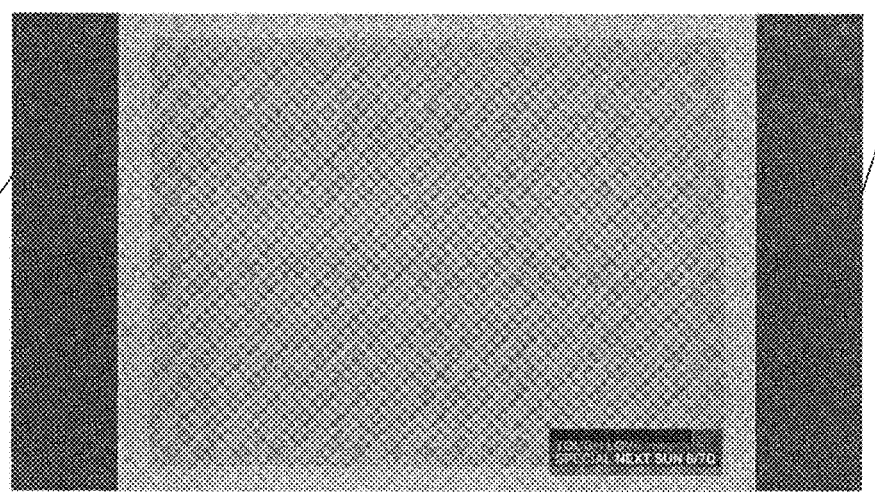
FIG. 4 shows how the graphics stream will be converted to a HD pillarbox layout.

FIG. 3 shows how the graphics stream 101 will be converted into a second graphics stream 301 with a second playout format. As shown in FIG. 3, the playout graphics stream 301 has a second playout format of SD fullscreen layout. A cut portion 305 is a portion of the graphics stream 101 that is cut or lost during the conversion. The cut portion 305 can be located on any outer region of the graphics stream 101, such as the top, bottom, left or right regions of the graphics stream 101. The cut portion 305 can also be located at both the top and bottom regions, as well as both the left and right regions of the graphics stream 101. For example, FIG. 4 shows the graphics stream 101 being converted to a playout format of HD pillarbox layout 401. With the HD pillarbox layout 401, there is a left cut portion 405*a* and a right cut portion 405*b*. Converting the graphics stream 101 can be done on the fly during playout of a broadcast.

Figure 5:
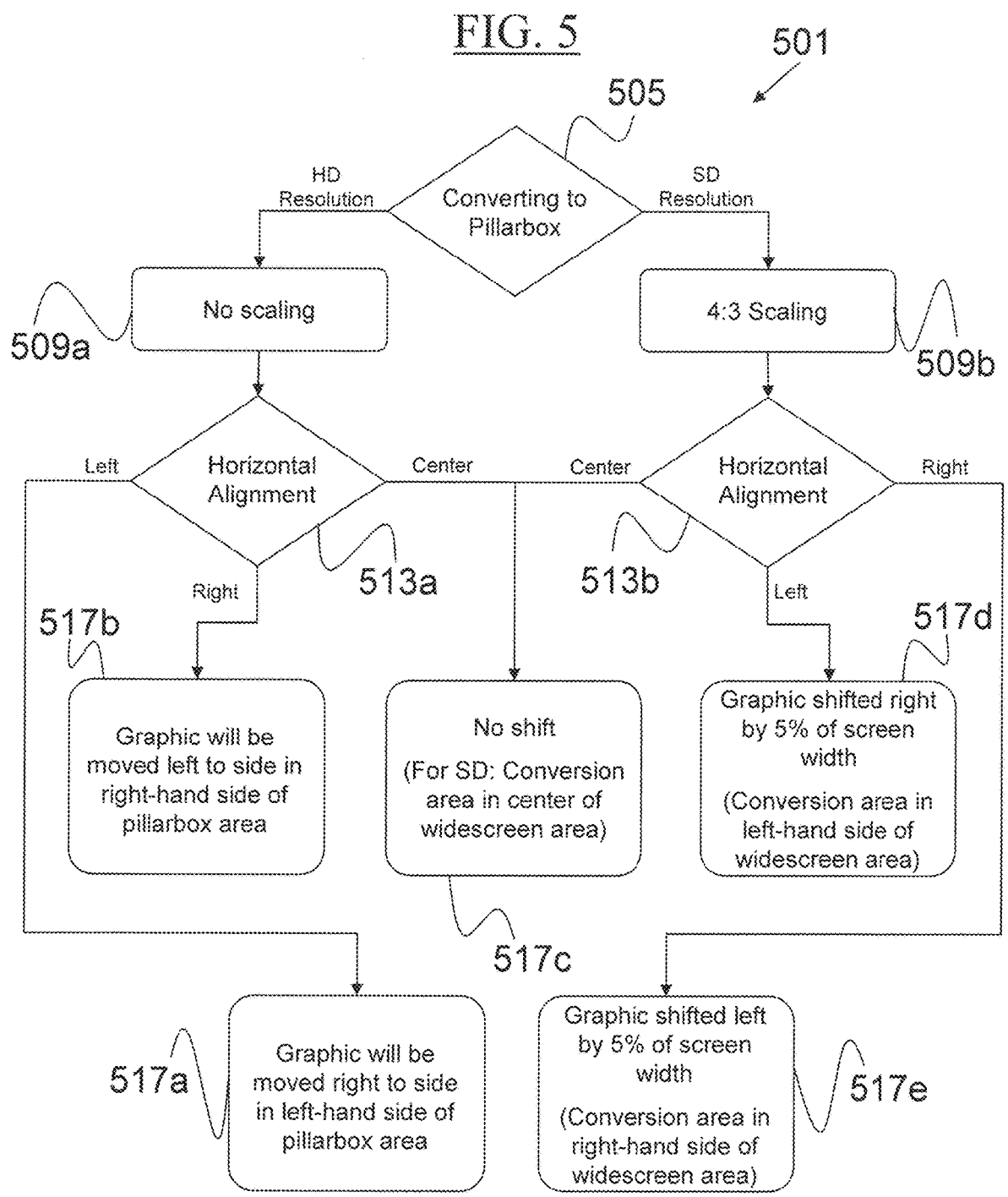
FIG. 5 shows a process for converting into a pillarbox display layout.

FIG. 5 shows a process 501 for converting a HD widescreen display layout into a pillarbox display layout. How exactly the display is affected though depends on if the target display format is in an HD resolution or in a SD resolution. Therefore, it is first determined 505 if the target resolution is an HD resolution or if it is a SD resolution. If a HD display resolution is selected, no scaling 509*a* is performed. If a SD resolution is desired though, a 4:3 scaling 509*b* is performed.

After the sealing step (if necessary), a determination 513*a* or 513*b* of the horizontal alignment is made. The determination 513*a* is used for HD display resolutions, and the determination 513*b* is used for SD display resolutions. The determination 513*a* can lead to three outcomes (i.e., outcomes 517*a-c*). The determination 513*b* can also lead to three outcomes (i.e., outcomes 517*c-e*).

The outcomes 517*a-e* determine how the graphic 109 is shifted, by a shift amount, as result of the conversion. Outcome 517*a* (i.e., the outcome for a conversion to HD pillarbox with a left horizontal alignment) moves the area of interest 113, including the graphic 109 to the right so the area of interest 113 (with graphic 109) sits in the left-hand side of the pillarbox area. In this situation, if the area of interest 113 is not moved, then at least a portion of the graphic 109 is cut off in the conversion. Outcome 517*b* (i.e., the outcome for a conversion to HD pillarbox with a right horizontal alignment) moves the area of interest 113 (including graphic 109) to the left so that the area of interest 113 (with graphic 109) sits in the right-hand side of the pillarbox area. Outcome 517*c* (i.e., the outcome for a conversion to SD or HD pillarbox with a center horizontal alignment) performs no shift of the area of interest 113. However, for the SD display resolution, the focal portion for scaling (i.e., a conversion area) can be the center of the widescreen area. Outcome 517*d* (i.e., the outcome for a conversion to SD pillarbox with a left horizontal alignment) shifts the area of interest 113 (with graphic 109) to the right by 5% of the screen width with a conversion area being in the left-hand side of the widescreen area. Outcome 517*e* (i.e., the outcome for a conversion to SD pillarbox with a right horizontal alignment) shifts area of interest 113 (with graphic 109) to the left by 5% of the screen width with a conversion area being in the right-hand side of the widescreen area.

In some embodiments, scaling 509*a* is performed for the HD display resolution. And in some embodiments where the target display is a SD resolution, scaling other than 4:3 scaling 509*b*, is used. For example, other aspect ratios can be used for scaling.

In other embodiments, a safety adjustment option can be used to indicate that the area of interest 113 (with graphic 109) should be shifted by a shift amount during conversion. The safety adjustment option can prevent the graphic 109 from being at the edge of a converted graphics stream and therefore potentially be cut off during the conversion. During conversion, the graphics stream 101 can be repositioned using the safety adjustment option to ensure the graphic 109 is still visible in a converted graphics stream. The shift amount can also be a configurable shift amount. The configurable shift amount can move the area of interest 113 (with graphic 109) farther away from the edge of a converted display. The configurable shift amount can also be used to ensure that the graphic 109 does not get cut off. The configurable shift amount can further be used so that the area of interest 113 (with graphic 109) can be displayed anywhere in a converted graphics stream. The configurable shift amount can be set by a content provider at the time the graphics steam 101 is created or broadcast and is indicated by a script.

Figure 6:
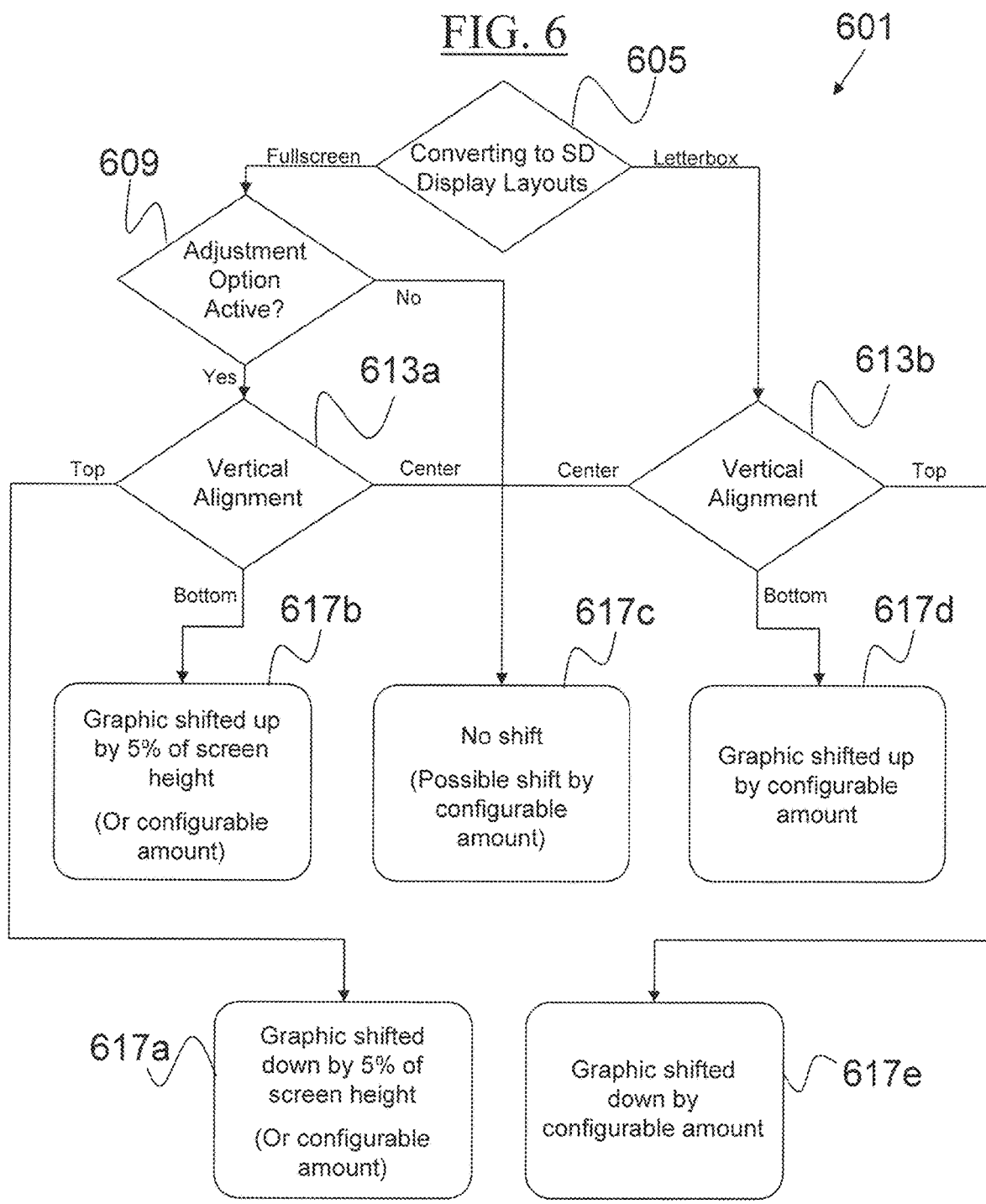
FIG. 6 shows a process for converting into a SD fullscreen display layout or a SD letterbox display layout.

FIG. 6 shows a process 601 for converting into a SD fullscreen display layout or a SD letterbox display layout. In either case, the vertical alignment can affect how the display is altered when converting from a HD widescreen display layout to a SD fullscreen or letterbox display layout. When converting to a SD display layout, different shift amounts can be used depending on the target display format. For example, a fullscreen display may perform different shifting than a letterbox display. If it is determined 605 that a fullscreen display is the target format, a determination 609 must be made to see if the safety adjustment option is active. If it is not, then no shift is performed. However, if it is, a determination 613*a* is made for the target vertical alignment for the area of interest 113 with graphic 109. Similarly, when formatting for a letterbox display format, a determination 613*b* is made for the target vertical alignment for the area of interest 113 with graphic 109. The determination 613*a* can lead to three outcomes (i.e., outcomes 617*a-c*). The determination 613*b* can also lead to three outcomes (i.e., outcomes 617*c-e*).

The outcomes 617*a-e* determines how the area of interest 113 (with graphic 109) is shifted, by a shift amount, as result of the conversion. Outcome 617*a* (i.e., the outcome for a conversion to fullscreen with a top vertical alignment) moves the area of interest 113 with graphic 109) down by 5% of the screen height. Outcome 617*b* (i.e., the outcome for a conversion to fullscreen with a bottom vertical alignment) moves the area of interest 113 (with graphic 109) by 5% of the screen height. Outcome 617*c* (i.e., the outcome for a conversion to fullscreen or letterbox with a center vertical alignment) performs no shift of the area of interest 113. Outcome 617*d* (i.e., the outcome for a conversion to letterbox with a bottom vertical alignment) shifts area of interest 113 (with graphic 109) up by a configurable amount. Outcome 617*e* (i.e., the outcome for a conversion to letterbox with a top vertical alignment) shifts the area of interest 113 (with graphic 109) down by a configurable amount.

In some embodiments, all possible conversions into a SD fullscreen display layout or a SD letterbox display layout can be shifted by a configurable amount.

Figure 7:
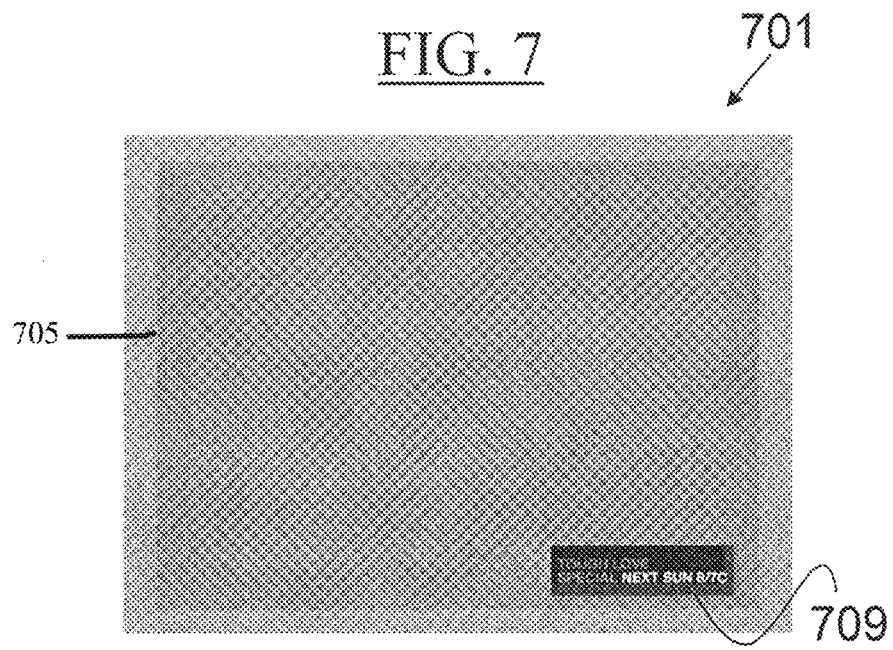
FIG. 7 shows a converted graphics stream in a SD fullscreen layout.
Figure 8:
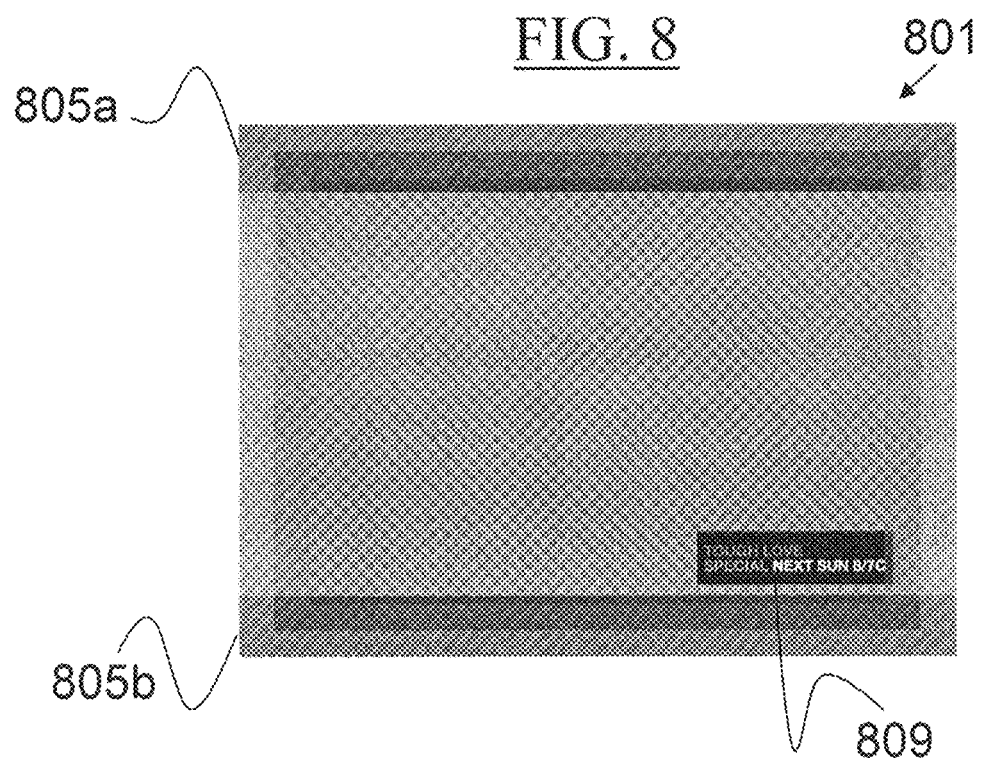
FIG. 8 shows how the converted graphics stream in a SD fullscreen layout will be converted to a SD letterbox layout.

The use of the safety adjustment option is shown in FIGS. 7 and 8. FIG. 7 shows a converted graphics stream 701 in a SD fullscreen layout. A graphic 709 in an area of interest 705 has a right horizontal alignment and a bottom vertical alignment. With the safety adjustment option active, the area of interest 705 (including graphic 709) can be shifted both up and to the left. This shift causes the graphic 709 to be moved away from the extreme bottom right corner of the converted graphics stream 701. Shifting can cause graphics to appear more aesthetically pleasing. Shifting can also be done to preserve the intended spacing or presentation that has been augmented or distorted during the conversion process. FIG. 8 shows how the converted graphics stream 701 in a SD fullscreen layout is converted to a SD letterbox layout 801. As shown in FIG. 8, the cut portions 805*a* and 805*b* cuts off both top and bottom portions of the converted graphics stream 701. In this example, at least a portion the graphic 709 is also cut off if the graphic 709 is not moved. Thus, a configurable amount can be used to move an area of interest 113 (including the graphic 809) up slightly so that it is completely visible in the SD letterbox layout 801.

In some embodiments, the area of importance 113 can include multiple custom areas of importance. These multiple custom areas of importance define multiple regions within the graphics stream 101 that must be displayed in any converted stream. Therefore, the area of importance 113 that includes custom areas of importance can include multiple configurable amounts to ensure all custom areas of importance can be displayed properly. Custom areas of importance can also have configurable shift amounts, meaning multiple graphics can be moved in any possible location in the converted graphics stream. This allows graphics to be preserved while giving freedom to rearrange the converted graphics stream so that all the graphics can fit on a display. Each custom areas of importance can have its own conversion allowing for all custom areas of importance found in a graphics stream to be converted differently. For example, one custom area of importance can be scaled while another custom area of importance is not scaled.

Figure 9:
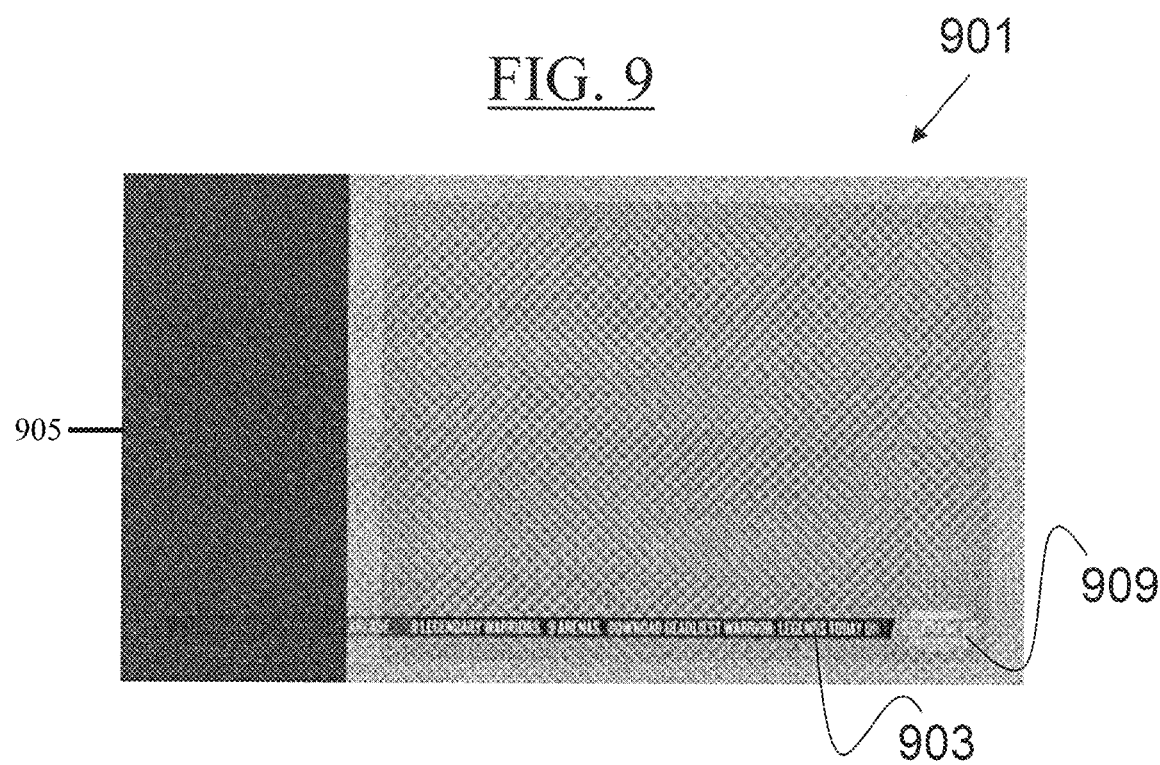
FIG. 9 shows how the graphics stream will be converted into a SD fullscreen layout while allowing a portion of a crawl graphic to be cut off.

FIG. 9 shows how the graphics stream 101 will be converted into a SD fullscreen layout 901 while allowing a portion of a crawl graphic 903 to be cut off. The crawl graphic 903 is a graphic that expands into a cut portion 905. The crawl graphic 903 is a graphic type that is designed so that a portion of it can be cut off during conversion. As shown in FIG. 9, the crawl graphic 903 scrolls text in a horizontal fashion, meaning, that cutoff text does not adversely affect the readability of text, as long as the crawl graphic 903 is scaled appropriately. A graphic 909 can be displayed along with the crawl message 903.

Figure 10:
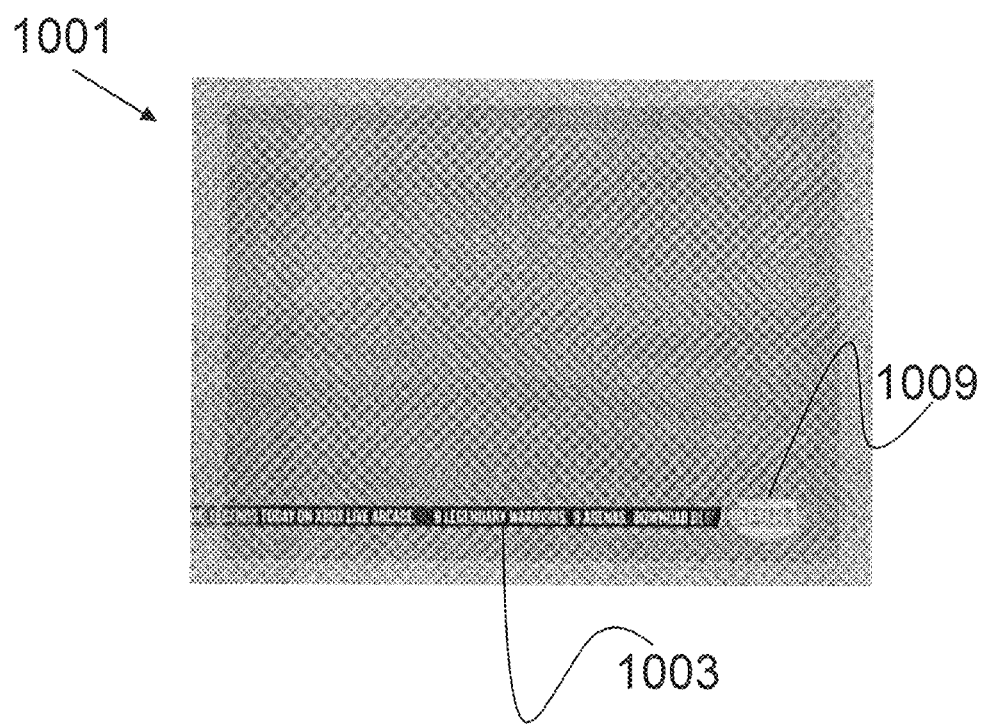
FIG. 10 shows a converted graphics stream in a SD fullscreen layout that includes a cutoff crawl message graphic.

FIG. 10 is the result of the conversion of FIG. 9. FIG. 10 shows a converted graphics stream 1001 in a SD fullscreen layout that includes a cutoff crawl graphic 1003 and a graphic 1009. In some embodiments, the graphic 909 can be the same as the graphic 1009.

Figure 11:
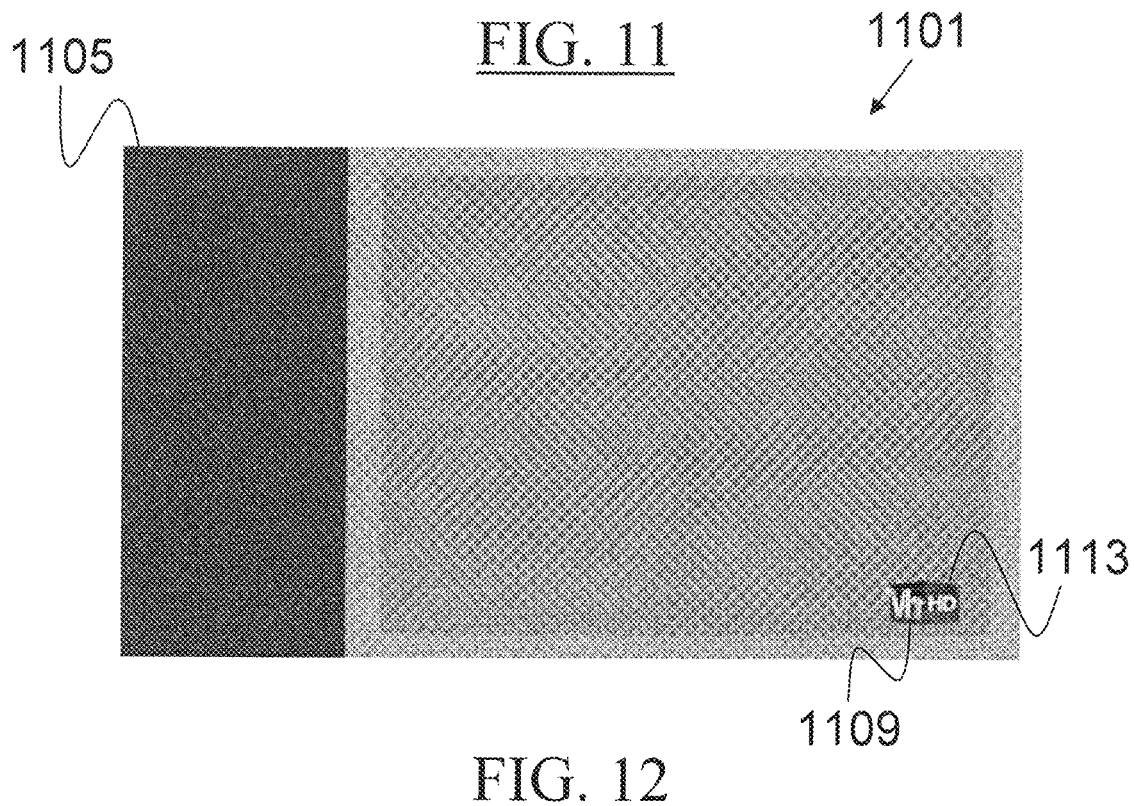
FIG. 11 shows how a graphics stream that includes a resolution graphic will be converted into a SD fullscreen layout.

FIG. 11 shows how the graphics stream 101 that includes a resolution graphic 1113 will be converted into a SD fullscreen layout 1101. The resolution graphic 1113 indicates the type of display resolution currently being used. The resolution graphic 1113 can be displayed near or on top of a graphic 1109 so that the graphic 1109 and the resolution graphic 1113 appear to be a single graphic. In some embodiments, the resolution graphic 1113 can be displayed only when a HD display resolution is used.

Figure 12:
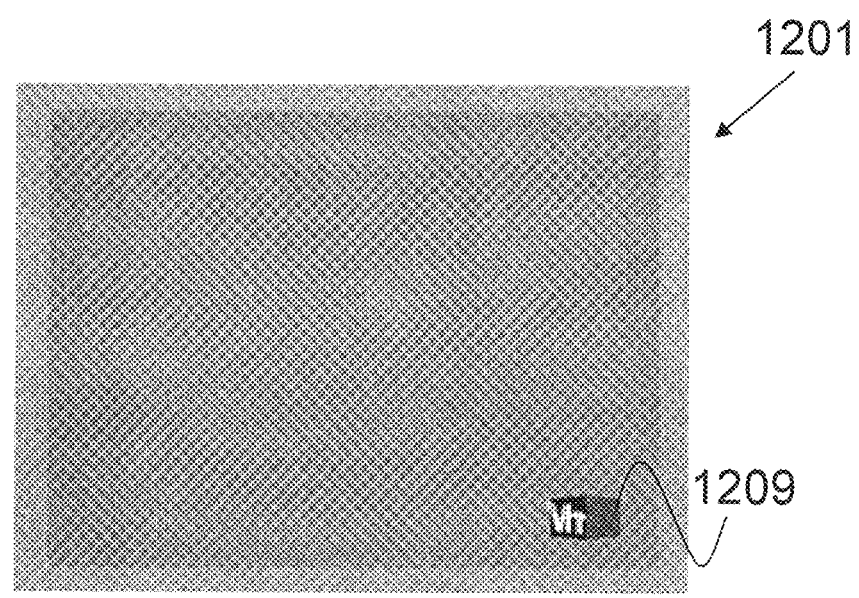
FIG. 12 shows a converted graphics stream in a SD fullscreen layout that does not include a resolution graphic.

FIG. 12 is the result of the conversion of FIG. 11 with a cut portion 1105 being lost. FIG. 12 shows a converted graphics stream 1201 in a SD fullscreen layout that does not include a resolution graphic. FIG. 12 also shows that the graphic 1209 has been shifted up as a result of the conversion.

Figure 13:
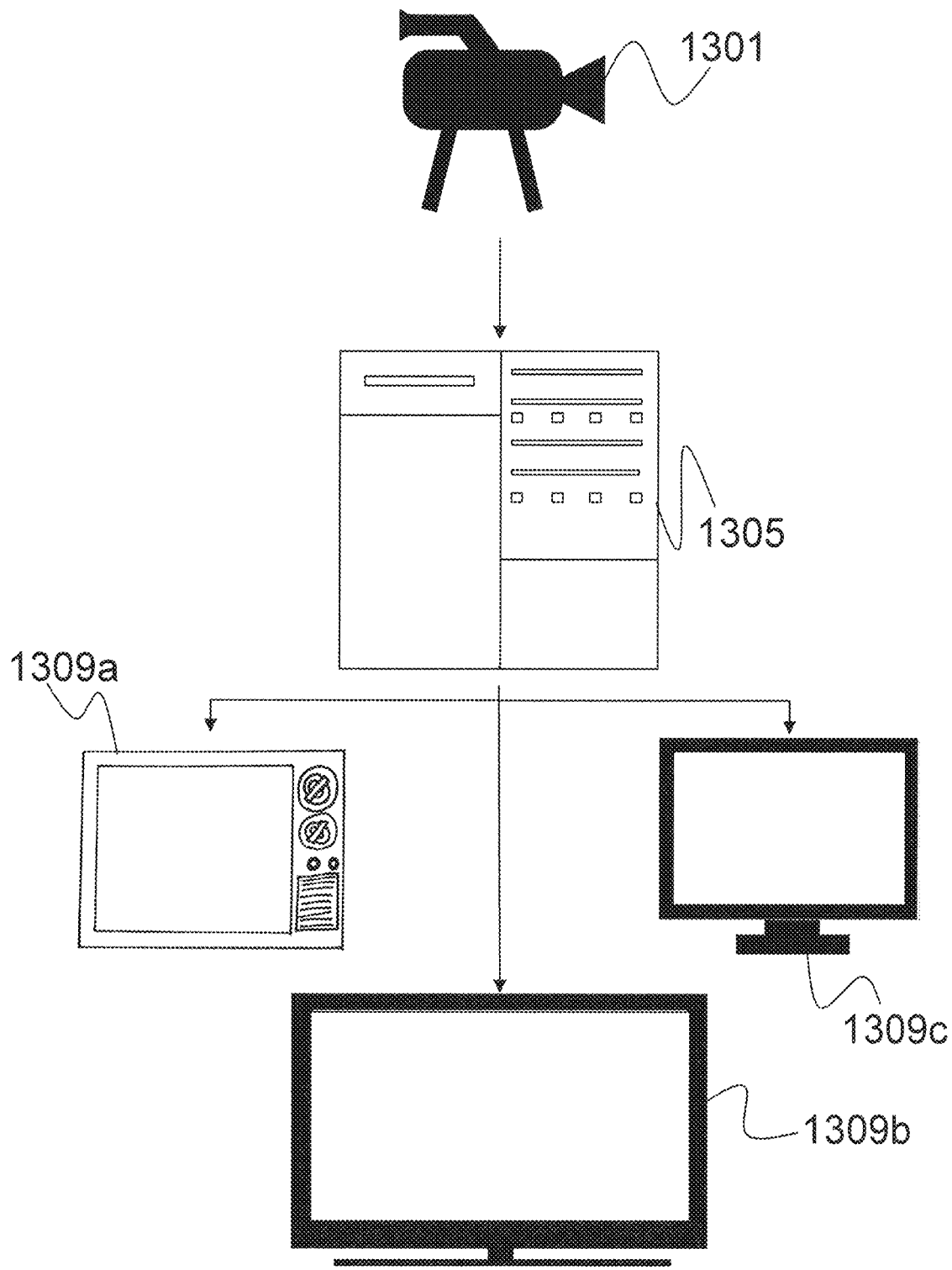
FIG. 13 shows how content is provided by content providers.

FIG. 13 shows how content is provided by content providers. A content provider either creates or receives content 1301. Content 1301 can be recordings of TV shows, movies, animated features, promotional shorts, commercial spots, and other forms of audiovisual content. The content 1301 is then broadcast or otherwise made available through a server-like device 1305, e.g., a server computer, a cable headend, a set-top box such as a TiVo® brand DVR or APPLE TV® or a computer such as a desktop computer or laptop. The server-like device 1305 can also save the content 1301. The content 1301 can be provided by the content provider to consumers through display devices 1309a-c. Although televisions are shown in FIG. 13, display devices 1309 can also include computers, tablets, mobile video devices or smartphones.

In FIG. 13, display device 1309a is a SD television capable of only displaying a SD fullscreen layout. Display device 1309b is a HD television capable of only displaying SD or HD fullscreen layout. Display device 1309c is a HD television capable of displaying any type of resolution or layout. In some embodiments, the server-like device 1305 can detect the type of resolution and layout the display devices 1309a-c can display and can broadcast content for the specific resolution and layout. In other embodiments, the server-like device 1305 can broadcast content for any specified resolution and layout. In still other embodiments, the server-like device 1305 can broadcast content for any specified and supported resolution and layout. The display devices 1309a-c are not limited to the specific state examples and can be televisions capable of display at an display resolution or layout.

The overall result of all these features can be a boost in productivity because only a single graphic is required to be created, instead of multiple SD and HD graphics with multiple options for positioning over varied content, such as fullscreen, pillarbox, or letterbox. This invention can also reduce scheduling burden, while leading to fewer scheduling errors and ultimately a higher-quality presentation.

The above-described techniques can be implemented in digital electronic circuitry, or in computer hardware, firmware, software, or in combinations of them. The implementation can be as a computer program product, i.e., a computer program tangibly embodied in a computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system and the components of the system can be interconnected by any form or medium of digital data communication, e.g., a communication network. Examples of communication networks include a local area network ("LAN") and a wide area network ("WAN"), e.g., the Internet, and include both wired and wireless networks.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

One skilled in the art will realize the invention may be embodied in other specific forms without departing from the spirit or essential characteristics thereof. The foregoing embodiments are, therefore, to be considered in all respects illustrative rather than limiting of the invention described herein. Scope of the invention is thus indicated by the appended claims, rather than by the foregoing description, and all changes that come within the meaning and range of equivalency of the claims are, therefore, intended to be embraced therein.

What is claimed is:

1. A method, executed by one or more computer processors in communication with one or more displays, for displaying graphics on the one or more displays comprising:
   receiving, by the one or more computer processors, a graphics stream in a first playout format, the first playout format comprising a first display resolution and a first display layout;
   determining, by the one or more computer processors, a second playout format, the second playout format comprising a second display resolution and a second display layout;
   identifying, by the one or more computer processors, an area of importance within the first display layout given the first display layout, the second display resolution, and the second display layout;
   identifying, within the second display format, cut portions of the graphics stream that will not be displayed in the second display layout;
   identifying, within the second display format, a viewing area comprising a portion of the second display layout within which the entire graphics stream will be displayed;
   determining, by the one or more computer processors, a preferred position within the second display layout for the area of importance, wherein the preferred position is a user-selected location;
   converting, by the one or more computer processors, the graphics stream from the first playout format into the second playout format using the area of importance and the preferred position; and
   displaying, by the one or more computer processors on the one or more displays, the converted graphics stream in the second playout format.

2. The method of claim 1, wherein the preferred position is determined to ensure that the area of importance is not positioned in the second display layout in an identified cut portion.

3. The method of claim 1, wherein the preferred position is determined to ensure that the area of importance is positioned within the second display layout.

4. The method of claim 1, wherein the preferred position is indicated by a video stream playout format associated with the second playout format.

5. The method of claim 1, wherein the user-selected location is selected by a graphic designer.

6. The method of claim 1, wherein the viewing area is one of a pillarbox area, a centercut area, a widescreen area, or a letterbox area.

7. The method of claim 1, further comprising:
   indicating at least one graphic of the graphics stream as graphics that are displayed in the second display layout.

8. The method of claim 7, wherein each of the at least one indicated graphic has at least one of a horizontal alignment and a vertical alignment.

9. The method of claim 8, wherein the horizontal alignment is one of left, center, or right.

10. The method of claim 8, wherein the vertical alignment is one of top, center, or bottom.

11. The method of claim 8, wherein the identifying the area of importance comprises defining a bounded region that covers a portion of the first playout format based on the first display layout, the second display layout, a first indicator for the horizontal alignment of the at least one indicated graphics, and a second indicator for the vertical alignment of the at least one indicated graphics.

12. The method of claim 1, wherein the converting the graphics stream further comprises shifting the graphics stream by a configurable shift amount based on content provider dynamic scripts.

13. The method of claim 12, wherein the content provider dynamic scripts include script variables, the script variables being used to indicate the first and second display resolutions and the first and second display layouts.

14. The method of claim 1, wherein the determining the second playout format comprises:
   reading a hint on a playlist used to override or supplement information from a video stream over which the graphics stream is to be displayed.

15. The method of claim 14, wherein the second playout format is indicated with a resolution graphic.

16. The method of claim 15, wherein the resolution graphic is displayed only when the second playout format is a high-definition format.

17. The method of claim 1, further comprising:
   displaying a crawl graphic, wherein the converting removes a portion of the crawl graphic.

18. The method of claim 1 wherein the second display resolution is one of a high-definition resolution or a standard-definition resolution.

19. A computer program product, tangibly embodied in a non-transitory computer readable storage medium, for displaying graphics on a display comprising, the computer program product including instructions being operable to cause a data processing apparatus to:

receive a graphics stream in a first playout format, the first playout format comprising a first display resolution and a first display layout;

determine a second playout format, the second playout format comprising a second display resolution and a second display layout;

identify an area of importance within the first display layout given the first display layout, the second display resolution, and the second display layout;

identify, within the second display format, cut portions of the graphics stream that will not be displayed in the second display layout;

identify, within the second display format, a viewing area comprising a portion of the second display layout within which the entire graphics stream will be displayed;

determine a preferred position within the second display layout for the area of importance, wherein the preferred position is a user-selected location;

convert the graphics stream from the first playout format into the second playout format using the area of importance and the preferred position; and display, on the one or more displays, the converted graphics stream in the second playout format.

20. A method, executed by one or more computer processors in communication with one or more displays, for displaying graphics on the one or more displays comprising:

receiving, by the one or more computer processors, a graphics stream in a first playout format, the first playout format comprising a first display resolution and a first display layout;

determining, by the one or more computer processors, a second playout format, the second playout format comprising a second display resolution and a second display layout;

determining, by the one or more computer processors, an area of importance within the first display layout given the first display layout, the second display resolution, and the second display layout;

determining, by the one or more computer processors, a preferred position within the second display layout, wherein the preferred position is a location in the second display layout that is in a relatively similar location as the area of importance in the first display layout;

converting, by the one or more computer processors, the graphics stream from the first playout format into the second playout format using both the area of importance and the preferred position concurrently; and displaying, by the one or more computer processors on the one or more displays, the converted graphics stream in the second playout format.

* * * * *